United States Patent [19]
Miramontes C.

[11] 3,808,805
[45] May 7, 1974

[54] PROCESS FOR THE CONVERSION OF EXHAUST GASES OF THE INTERNAL COMBUSTION ENGINES INTO HARMLESS PRODUCTS

[76] Inventor: Luis E. Miramontes C., El Greco No. 39-204-B, Mexico City, Mexico

[22] Filed: June 21, 1972

[21] Appl. No.: 264,999

[30] Foreign Application Priority Data
Sept. 28, 1971 Mexico .................................. 130421

[52] U.S. Cl. .................. 60/274, 60/279, 60/297, 60/299, 60/304, 60/309, 60/315, 60/320
[51] Int. Cl. ...... F02b 75/10, F01n 3/02, F01n 3/14
[58] Field of Search ............. 60/278, 279, 299, 309, 60/320, 274, 304–306, 321, 39.52, 297, 315; 123/119 A

[56] References Cited
UNITED STATES PATENTS

| | | | |
|---|---|---|---|
| 3,389,972 | 6/1968 | Pottharst | 60/320 X |
| 1,897,746 | 2/1933 | Winslow | 60/304 |
| 3,618,576 | 11/1971 | Dixon | 60/39.52 X |
| 3,621,652 | 11/1971 | Demaree | 60/310 X |
| 1,201,545 | 10/1916 | Bischof | 60/39.52 X |
| 3,677,239 | 7/1972 | Elkins | 123/119 A |
| 3,613,363 | 10/1971 | Jubb et al. | 60/309 X |
| 3,100,376 | 8/1963 | Potter | 123/119 A X |
| 3,666,422 | 5/1972 | Rossell | 60/315 X |
| 3,736,745 | 6/1973 | Karig | 60/279 X |
| 3,732,695 | 5/1973 | Shaw | 60/320 X |

*Primary Examiner*—Carlton R. Croyle
*Assistant Examiner*—Robert E. Garrett
*Attorney, Agent, or Firm*—Eric H. Waters

[57] ABSTRACT

A process involving the conversion of the exhaust gases of the internal combustion engines into harmless products by contacting said gases with an additional amount of air, circulating the resulting mixture through a dual cooler system having a heat exchanger and pipe with a plurality of fins, such cooled gaseous mixture is compressed in a pressure chamber, wherein the water vapor in the gases is condensed and discarded whereas the remaining gaseous portion is either fed back to the engine for recycling, or to a catalytic reactor so as to effect an exhaustive combustion of the waste gases, which therefore evolve as harmless products.

4 Claims, 1 Drawing Figure

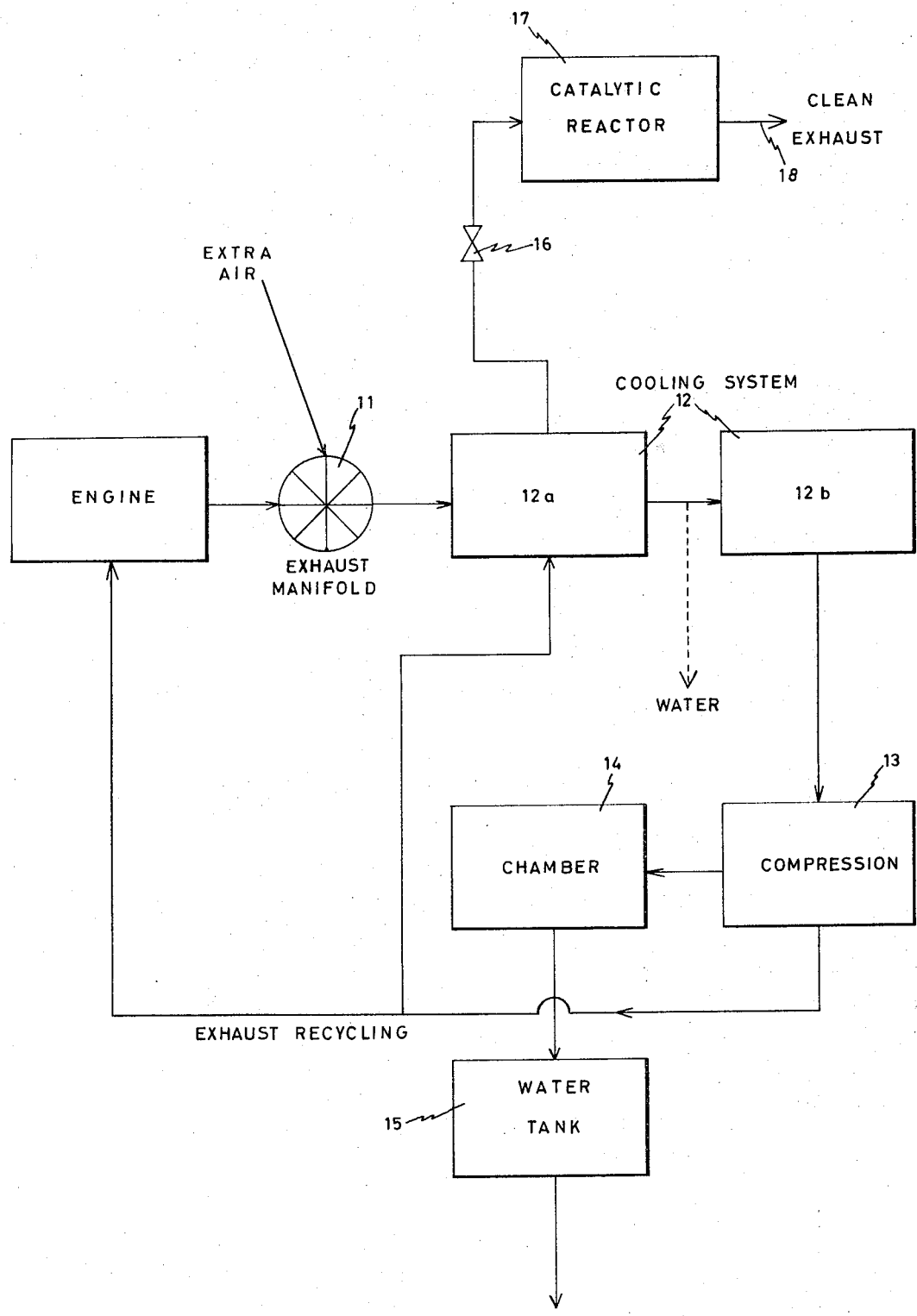

PROCESS FOR THE CONVERSION OF EXHAUST GASES OF THE INTERNAL COMBUSTION ENGINES INTO HARMLESS PRODUCTS

GENERAL DESCRIPTION

The present invention is related to a process for converting, into harmless products, the gases derived from combustion engines operated by conventional fuels such as gasoline, diesel, kerosene, etc.

The problem of atmospheric pollution or contamination due to an incomplete combustion of the above mentioned fuels in internal combustion engines has lately attracted the attention of the authorities and private entities, since a polluted or contaminated atmosphere is harmful for the plants and human beings.

Up to the present, various processes have been devised contemplating to reduce the percentage of harmful gases and products derived from the combustion, but the results obtained have not been fully satisfactory since, on one hand, it is necessary to invest tremendous amounts of money in expensive equipment and of little otherwise practical use and, on the other hand, no complete removal of the harmful materials has been obtained.

By means of the present invention, the above problems are completely solved, thanks to the provision of a simple, efficient and economic process.

OBJECTS OF THE INVENTION

Therefore, one of the objects of the present invention is to provide a process for converting the exhaust gases of the internal combustion engines into harmless products by a modification in the combustion of said gases, thereby obtaining a consequent change in the chemical equilibrium of the remaining components.

An additional object of the present invention is to provide a process to substantially remove the harmful materials and injurious products in the gases originating from the engines' exhaust, by using a system of mechanical units with which said exhaust gases are cooled and compressed. With this process, the water is separated from said gases and the relative concentration of the remaining components is changed, thereby modifying the chemical equilibrium in such a manner that the undesirable components are converted easily into harmless substances in passing subsequently through a catalyst reactor and/or recycling some through the engine.

These and other objects of the present invention will appear more clearly described as the description of the same proceeds.

GENERAL DISCLOSURE OF THE INVENTION

The subject process of the present invention is carried out by means of the practical performance of the basic idea of removing the water from said exhaust gases, thereby obtaining two essential effects, namely:

a. to reduce to about half, the volume of the exhaust gases, thus increasing the efficiency in the capacity of said catalytic converters when the latter are used;

b. the change of the concentration of the harmful components in relation to the total volume, thereby assisting the conversion of said components into harmless elements since the concentration of same are substantially reduced in passing through a catalytic reactor and/or in recycling them through the engine.

Consequently, the process is carried out injecting a determined volume of air, into the exhaust gases immediately after leaving the engine, at varying distances, in order to obtain a complete combustion. Immediately thereafter, the exhaust gases are directed through a refrigerating system to cool the same at a temperature substantially below 100° C.; then, the gases pass through a compressor, wherein the water is condensed due to the applied compressive effect.

The condensed water is removed by a condensate trap and the waste gases are partially recycled to the engine's cylinders and/or to a catalytic reactor.

The above process can be carried out in an auxiliary stage before the compression final step, sending the waste gases to a catalytic reactor wherein their conversion is completed into harmless products.

The analysis of the gases evolved to the surrounding atmosphere indicates that the concentration of the noxious elements is less than that allowed by the regulations. Therefore, the efficiency of the present process is highly satisfactory.

The practical realization of the instant invention will be better understood with reference to the enclosed FIGURE in which a normal exhaust manifold 11 is shown to which the air is injected in a ratio of 15 to 25 percent of air in relation to the quantity of the exhaust gases.

The fuel gases and air mixture are then passed through a dual cooling system 12a and 12b provided with a heat exchanger and a pipe with cooling fins where the gaseous mixture is cooled to a temperature below 100° C., and said mixture then passes to the compressor 13 where the steam or water vapor of the gaseous mixture is deposited in chamber 14, passing later the condensed water to the tank 15 and discarded by means of a gas trap, preventing the gases to escape letting only the condensed water to get through. The exhaust gases can then be either partially recycled to the engine's cylinders or they can be heated and delivered to a catalytic reactor, in order to complete their conversion into harmless products.

In the FIGURE, there is also shown a valve 16 to adjust the delivery of gases to the exhaust pipe which is equipped with a catalytic muffler 17, the outlet line extending to pipe 18 that discharges the free contaminant gases to the surrounding atmosphere.

The following examples illustrate the experimental manner in which the process of the present invention is to be carried out, although same are not to be considered limitative thereof, since only the specific aspects of the described process are involved.

Example 1

An internal combustion engine of high cylinder capacity was conditioned in order to inject air into the exhaust gases immediately after leaving the engine in a ratio of 15 to 25 percent of their volume of exhaust and at varying distances, to provide enough oxygen to obtain a complete combustion. Thereafter, the exhaust gas was directed through a dual cooling system that exchanges heat with atmospheric air (12b) by a pipe provided with fins until it is cooled to a temperature below 100° C., and then it is subjected to a suction effect of a compressor that discharges the gas to a controlled pressure chamber in which the water is condensed. This is removed by a trap allowing only the exit of the water. The waste gases are partially recycled to the engine's cylinders. On analysis, the gas discharged to the surrounding atmosphere was found to contain noxious elements in a concentration below that allowed by the regulations.

Example 2

An internal combustion engine of high cylinder capacity was conditioned in order to inject air to the exhaust gases immediately after leaving the engine in a ratio of 10 to 25 percent of their volume, in order to provide enough oxygen to obtain a complete combustion. Thereafter, the exhaust gas was directed to a dual cooling unit that exchanges the heat with atmospheric air (12b) until cooled to a temperature considerably below 100° C., and then it is subjected to a suction effect of a compressor that discharges the gas to a controlled pressure chamber in which the water is condensed. This is removed to the exterior by a trap, allowing only the exit of the water. The waste gas is heated and delivered to a catalytic reactor in order to complete its conversion.

To carry out the process of the present invention, conventional apparatus are used, since for the cooling of the combustion gases a heat exchanger and a pipe provided with fins is employed and the compressor mentioned in the examples is of the rotatory piston or diaphragm type.

As regards the noxious elements, the concentration of which is reduced, it can be said that such elements are basically the hydrocarbons not fully burned, as well as carbon dioxide or monoxide. The chemical equilibrium of said conversion is carried out in accordance with the following equations:

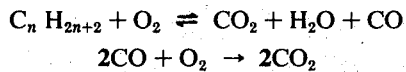

$$C_n H_{2n+2} + O_2 \rightleftharpoons CO_2 + H_2O + CO$$

$$2CO + O_2 \rightarrow 2CO_2$$

The invention has been described in accordance with the preferred embodiments for carrying out same, therefore, any variation made to the above process must necessarily fall within the envisaged limits for the scope of the present specification and the accompanying claims.

I claim:

1. A process of converting exhaust gases of an internal combustion engine, which contain noxious components, into harmless compounds, and increasing the efficiency of catalytic reactors to which the exhaust gases are fed, comprising the steps of contacting the exhaust gases with a certain amount of air before said feeding step; circulating the resulting gaseous mixture through a cooling system, thereby lowering the temperature of the exhaust gases; compressing the gaseous mixture, thereby to condense water vapor in the gases; removing and discharging the condensed water; and reheating the exhaust gases before said feeding step.

2. The process as defined in claim 1, further comprising the step of partially recycling the exhaust gases to the engine after said compressing step, thereby reducing some of the noxious components.

3. The process as defined in claim 1, wherein about 15 to 25 percent of air is injected into the exhaust gases in the course of said air contacting step.

4. The process as defined in claim 1, wherein the temperature of the gaseous mixture is substantially below 100° C. in said circulating and cooling step.

* * * * *